Dec. 31, 1929.　　C. P. LAMONS　　1,741,636
DENSITY REGULATOR FOR SEED ROLLS ON LINTERS
Filed May 20, 1929
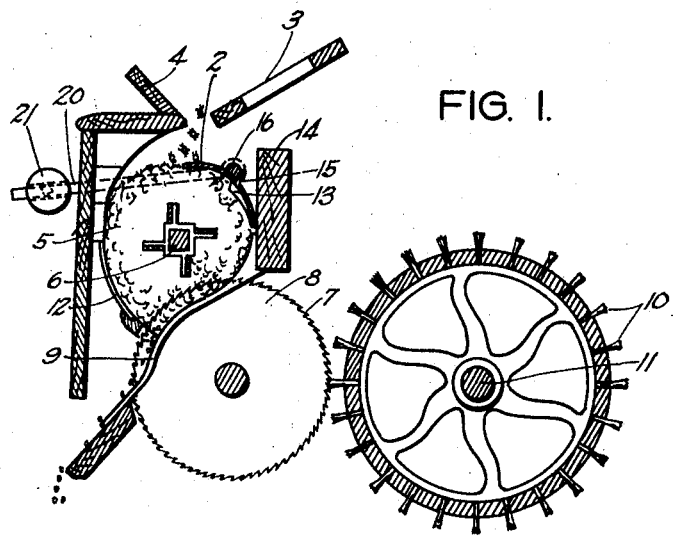
FIG. 1.
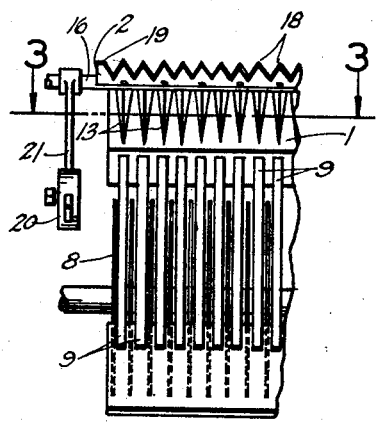
FIG. 2.
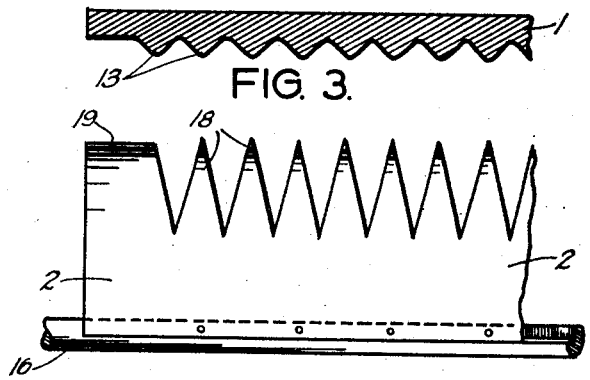
FIG. 3.
FIG. 4.
Charles P. Lamons INVENTOR
BY Loyal J. Miller
ATTORNEY Patented Dec. 31, 1929

1,741,636

UNITED STATES PATENT OFFICE

CHARLES P. LAMONS, OF CHICKASHA, OKLAHOMA

DENSITY REGULATOR FOR SEED ROLLS ON LINTERS

Application filed May 20, 1929. Serial No. 364,605.

My invention relates to density regulators for cotton seed de-linting machines and the like.

The objects of my invention are to provide a device of this class which is new, novel, practical and of utility; which will be used in connection with variously designed de-linting machines, otherwise known as linters, now in common use in cotton seed oil mills and the like; which, applied to such machines, will permit the handling of a greater tonnage of seed; which will recover a greater poundage of lint per ton of seed; which will conserve power; which will permit the use of a smaller number of linter machines per tonnage of output, thereby conserving investment in space, in number of machines, and in the power required to drive same; which is durable, which is simple in installation; which is inexpensive in manufacture; which will be efficient in accomplishing all the purposes for which it is intended.

With these and other objects in view as will more fully appear my invention consists in the construction, novel features, and combination of parts hereinafter more fully described, pointed out in the claims hereto appended, and illustrated in the accompanying one-sheet drawing, of which, Figure 1 is a fragmentary elevational sectional view of a common type of delinting machine showing my device disposed thereupon;

Fig. 2 is a fragmentary elevational view showing the grate ribs and saws, with my device disposed thereabove;

Fig. 3 is a fragmentary sectional view of a part of my device taken along the lines 3—3 of Fig. 2; and Fig. 4 is a fragmentary plan view of a portion of my device.

Like characters of reference designate like parts in all the figures.

It is understood that various changes in the form, proportion, size, shape, weight and other details of construction, within the scope of my invention may be resorted to without departing from the spirit or broad principle of my invention and without sacrificing any of the advantages thereof; and it is also understood that the drawings are to be interpreted as being illustrative and not restrictive.

It is understood that in the separation of cotton from the seed in the ginning process, a considerable portion of lint is held fast by the seed. Delinting machines or linters are commonly resorted to for removal of this residue of lint for the manufacture of linters or cotton felt and for the further cleaning of the seed which later is to be used in the manufacture of various products.

The delinting process is usually accomplished by a linter designed practically as partly shown in Fig. 1, the latter, however, illustrates a linter with my device 1 and 2, positioned thereupon. From a receptacle above, the cotton seed is controllably fed downward, guided by trough sides 3 and 4, and forms a long roll 5 rotated anti-clockwise by a float shaft 6. As the flow of seed continues, roll 5 increases in diameter until the lint upon the periphery of the roll is contacted by the teeth 7 of the plurality of saws 8 rotating clockwise. A plurality of brushes 10 rotating upon a shaft 11 remove the lint so gathered by the saws and the same is disposed of in a usual manner not pertinent to this application. The seed, prevented by a plurality of set parallel ribs 9, from following the lint, gravitate to a receptacle, not shown, below.

In practice it is found that the lint covered seed, forming the bulk of said roll 5, becomes tightly compressed due to continued pressure from the curved portions 12 of the breast, of the grate ribs 9, of the interextending teeth 7 and sides of the saws 8, and of the pressure of the gratefall and gratefall extensions, the last two of which occupy the positions in usual linters as are occupied by my device shown as 1 and 2 in Fig. 1. The compression of lint seed and the continued action of said saws 8, result in forming annular grooves in the roll opposite the saw blades, and therebetween, annular ridges or humps. It is the purpose of this invention to bring pressure to bear upon and thereby flatten out these annular ridges or humps in the roll, thus forcing more of the seed to contact the rotating saws.

A practical embodiment of the invention as illustrated in the drawings includes:

A gratefall curve 1 consisting of a transversely curved plate having spacedly and laterally upstanding from its concave surface a plurality of ribs 13, triangular both as to base and as to elevation. Said gratefall curve 1 at its lower edge or base portion, adjacent the points of said triangular ribs 13 contacts a supporting member 14 of a common linter. Extending outwardly and upwardly from said supporting member 14 said gratefall curve 1 is again curved sharply upward and outward at its free edge portion to form a hemi-cylindrical channel 15 for movably seating the usual shaft 16.

Rigidly positioned upon said shaft 16 is said gratefall extension curve 2, the downward pressure of which is controllably regulated by slide weight 21 on arm 20 extending from and rigidly secured to said shaft 16. Said gratefall extension curve 2 is a plate curved similarly to said gratefall curve 1, and has a plurality of triangular serrations 18 upon its free edge 19. The points of said serrations 18 are alined with the upstanding edges of said ribs 13 on said gratefall curve 1, and both said serrations 18 and ribs 13 are so positioned as to oppose centrally the space between said saws 8, positioned below, as shown in Figs. 1 and 2.

It is through the pressure exerted upon said roll 5 by these said ribs 13 and pointed serrations 18, that the annular ridges or humps thereupon are flattened out and forced to fill the grooves formed by the rotating saws 8. By this means the face of the roll 5 is broken up, new seed is forced into the serrations formed by the saw; seed that otherwise would lie inert are presented to the saws and the delinting process is substantially accelerated; the seed is more quickly relieved of its lint and a greater amount of lint is recovered.

Obviously, the invention is susceptible of embodiment in forms other than that which is illustrated in the accompanying drawings and described herein, and applicable for uses and purposes other than as detailed, and I therefore consider as my own all such modifications and adaptations and other uses of the form of the device other than as herein described as fairly fall within the scope of my invention.

Having thus described my invention what is claimed and desired to be secured by Letters Patent, is:

1. A device, as described, embodying, a gratefall curve adapted to be operatively positioned within a delinting machine, a plurality of upstanding ribs spacedly disposed laterally upon the concavely curved face of said gratefall curve, a gratefall extension curve hingedly positioned upon the upper edge portion of said gratefall curve, a plurality of teeth formed upon the upper free edge portion of said extension curve, all as and for the purposes specified.

2. A device, as described, embodying, a gratefall curve adapted to be operatively positioned within a delinting machine, a plurality of triangular, upstanding, beveled sided, sharp edged ribs spacedly disposed laterally upon the concavely curved face of said gratefall curve, a gratefall extension curve hingedly positioned upon the upper edge portion of said gratefall curve, a plurality of spaced teeth formed upon the upper free edge portion of said extension curve, all as and for the purposes specified.

3. A device, as described, in combination, a gratefall curve adapted to be operatively positioned within a delinting machine, a plurality of upstanding ribs spacedly disposed laterally upon the concavely curved face of said gratefall curve, a gratefall extension curve hingedly positioned upon the upper edge portion of said gratefall curve, a plurality of teeth formed upon the upper free edge portion of said extension curve, all as and for the purposes specified.

4. A device, as described, in combination, a gratefall curve adapted to be operatively positioned within a delinting machine, a plurality of triangular, upstanding, beveled sided, sharp edged ribs spacedly disposed laterally upon the concavely curved face of said gratefall curve, a gratefall extension curve hingedly positioned upon the upper edge portion of said gratefall curve, a plurality of spaced teeth formed upon the upper free edge portion of said extension curve, all as and for the purposes specified.

5. The combination with a delinting machine adapted to operatively position a gratefall curve and a gratefall extension curve, of a gratefall curve adapted to be operatively positioned within said delinting machine, a plurality of upstanding ribs spacedly disposed upon the concavely curved face of said gratefall curve, a gratefall extension curve hingedly positioned upon the upper edge portion of said gratefall curve, a plurality of spaced teeth formed upon the upper free edge portion of said extension curve, all as and for the purposes specified.

6. The combination with a delinting machine adapted to operatively position a gratefall curve and a gratefall extension curve, of a gratefall curve adapted to be operatively positioned within said delinting machine, a plurality of triangular, pointed, upstanding, beveled sided, sharp edged ribs spacedly disposed upon the concavely curved face of said gratefall curve, a gratefall extension curve hingedly positioned upon the upper edge portion of said gratefall curve, a plurality of spaced teeth formed upon the upper free edge portion of said extension curve, all as and for the purposes specified.

CHARLES P. LAMONS.